United States Patent [19]
Inagaki et al.

[11] Patent Number: 5,295,289
[45] Date of Patent: Mar. 22, 1994

[54] METHOD OF MANUFACTURING ELECTRONIC COMPONENTS

[75] Inventors: Yasuto Inagaki; Yoshiaki Kohno, both of Kyoto, Japan

[73] Assignee: Murata Manufacturing Co., Ltd., Japan

[21] Appl. No.: 955,838

[22] Filed: Oct. 2, 1992

[30] Foreign Application Priority Data

Oct. 3, 1991 [JP] Japan .................................. 3-255640

[51] Int. Cl.$^5$ ............................................. H01G 4/30
[52] U.S. Cl. ................................. 29/25.42; 361/304
[58] Field of Search ............... 29/25.42, 854–856; 427/79–81; 361/303, 304

[56] References Cited

FOREIGN PATENT DOCUMENTS 60-109204  6/1985  Japan .

OTHER PUBLICATIONS

European Search Report—EP 92 30 9050.
Patent Abstracts of Japan, vol. 013544, Jun. 12, 1989.

*Primary Examiner*—Carl E. Hall
*Attorney, Agent, or Firm*—Ostrolenk, Faber, Gerb & Soffen

[57] ABSTRACT

A method for efficiently forming external electrodes of desired thicknesses on chip electronic components such as multilayer ceramic capacitors. Cutting grooves are formed in a block along surfaces to be provided with external electrodes. The block is divided into individual chips after metal paste for forming external electrodes is cast into the cutting grooves and dried. The metal paste filling up each of the cutting grooves is cut with a blade to be divided into two parts. The two parts of the metal paste thus formed with the blade define external electrodes. The present invention can also be applied to form external electrodes in an electronic component array comprising a plurality of electronic component elements.

11 Claims, 3 Drawing Sheets

METHOD OF MANUFACTURING ELECTRONIC COMPONENTS

BACKGROUND OF THE INVENTION

1. Field of the Invention

The present invention relates to a method of manufacturing electronic components such as chip capacitors or chip resistors or an electronic component array such as a capacitor array. More particularly, the present invention relates to a method of manufacturing electronic components, including a step of forming external electrodes on such electronic components.

2. Description of the Background Art

As one example of the prior art, Japanese Patent Laid-Open No. 60-109204 (1985) describes a conventional method of forming external electrodes on chip components.

According to this prior art reference, external electrodes are formed on chip components by the following procedure:

(1) A first and a second holding plate are prepared, each of which is formed by an elastic body provided with a plurality of receiving holes passing therethrough across the front and rear surfaces of the elastic body.

(2) Ends of chip components are the receiving holes of the first holding plate from the front side thereof, so that first ends of the chip components are exposed on the front surface of the first holding plate.

(3) Metal paste is applied to the first ends of the chip components which are exposed on the front surface of the first holding plate, and the paste films thereby formed are dried.

(4) The front surface of the first holding plate is at a position opposed to the front surface of the second holding plate. The first ends of the chip components provided with the metal paste films, and held by the first holding plate, are pushed into the receiving holes of the second holding plate so that second ends of the chip components, without metal paste films, are exposed on the front surface of the second holding plate, thereby transferring the chip components from the first holding plate to the second holding plate.

(5) Metal paste is applied to the second ends of the chip components which are exposed on the front surface of the second holding plate, and the metal films thereby formed are dried.

(6) The chip components are then taken out from the second holding plate.

(7) The chip components treated in the aforementioned manner are heat treated in a heat treat furnace so that the metal paste films are fired, thereby forming external electrodes.

In the aforementioned conventional method, however, it is necessary to handle separate chip components for forming external electrodes thereon, and hence equipment is required for orienting the chip components along a constant direction. Such equipment includes, for example, the aforementioned first and second holding plates, and a device for pushing the chip components into the receiving holes of the first holding plate along a constant direction. Further, a relatively large number of steps must be carried out in order to form the external electrodes after the above equipment.

In addition, thicknesses of the metal paste films formed tend to disperse in the aforementioned conventional method.

SUMMARY OF THE INVENTION

Accordingly, an object of the present invention is to provide a method of manufacturing chip electronic components, which can reduce the number of steps for forming external electrodes with simplified equipment, while reducing dispersion in thickness of the external electrodes.

The present invention is directed to a method of manufacturing chip electronic components, each of which is provided with external electrodes on both end surfaces thereof. In order to solve the aforementioned technical problems, the present invention comprises a step of preparing a block for providing a plurality of chip electronic components upon cutting along surfaces to be provided with external electrodes, a step of forming cutting grooves in the block along the surfaces to be provided with external electrodes, a step of applying metal paste for forming external electrodes into the cutting grooves, and a step of cutting the metal paste filling up each of the cutting grooves for dividing the same in two.

According to the present invention, the metal paste for forming external electrodes is applied into the cutting grooves provided in the block, while the block is still maintained in its original shape. Further, the metal paste filling up each of the cutting grooves is divided in two, to define external electrodes for an adjacent pair of chip electronic components.

Thus, according to the present invention, the metal paste is applied to the block, which is easier to handle as compared with the chip components being separately handled in the conventional method. Thus, the metal paste can be easily applied to prescribed positions.

Further, it is not necessary to orient separate chip components along a constant direction unlike the conventional method, whereby at least one step for such an operation can be omitted.

In addition, the thicknesses of the external electrodes are determined by spaces provided by the cutting grooves and the thickness of a blade which is employed for cutting the metal paste filling up each of the cutting grooves and dividing the same in two. Thus, it is possible to reduce dispersion in thickness of the external electrodes, while the thicknesses of the external electrodes can be easily controlled.

The present invention can be advantageously applied to manufacture of chip-type ceramic electronic components such as for example multilayer ceramic capacitors, for. In this case, the block may be prepared in a state containing a green ceramic material, i.e., in an unfired state, so that a step of cofiring the metal paste with the green ceramic material is carried out after the step of cutting the metal paste. This specific method is usefully applied to manufacture chip-type ceramic electronic components such as multilayer ceramic capacitors which are provided therein with internal electrodes of a base metal such as nickel, in particular. In this case, it is hard to attain mutual dissolution of the nickel, forming the internal electrodes, with silver, forming external electrodes. Therefore, nickel paste is first applied onto the block as a first layer for forming external electrodes and cofired with the ceramic material contained in the block. The paste containing silver is then applied as a second layer onto the nickel film so obtained, and baked. In this case, the step of formal external electrodes of the present invention can be advantageously applied for formation of the first layer of nickel to external electrodes.

The present invention can also be effectively applied to manufacture of an electronic component array comprising a plurality of electronic component elements, each of which is provided with external electrodes on both end surfaces thereof, and a carrier part holding the electronic component elements in common with spaces defined therebetween. A method of manufacturing such an electronic component array according to the present invention comprises the steps of preparing a block for providing electronic component elements and a carrier part, forming grooves in the block, not to reach the carrier part, along surfaces to be provided with external electrodes, applying metal paste for forming external electrodes into the grooves, and cutting the metal paste filling up each groove for dividing the same in two.

The foregoing and other objects, features, aspects and advantages of the present invention will become more apparent from the following detailed description of embodiments of the present invention when taken in conjunction with the accompanying drawings.

DESCRIPTION OF THE PREFERRED EMBODIMENTS

FIGS. 1(a) to 1(d) illustrate steps included in an embodiment of the present invention, which is directed to manufacturing of multilayer ceramic capacitors.

Figure 1A:
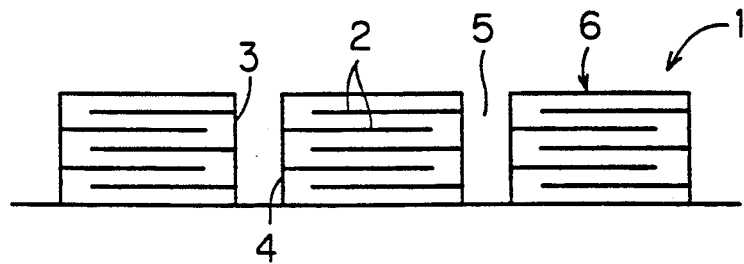
FIGS. 1(a) to 1(d) are sectional views showing steps included in an embodiment of the present invention.

As shown in FIG. 1(a), a block 1 is prepared from a layered product of green ceramic sheets. This block 1 is provided therein with layers of a plurality of internal electrodes 2 for forming electrostatic capacitance. The block 1 provides a plurality of chip-type multilayer ceramic capacitors when the same is cut along surfaces 3 and 4 which are to be provided with external electrodes.

Then, cutting grooves 5 are formed in the block 1, along the surfaces 3 and 4 which are to be provided with external electrodes, as shown in FIG. 1(a). Due to formation of the cutting grooves 5, the block 1 is divided into a plurality of chips 6 for defining individual multilayer ceramic capacitors respectively. The cutting grooves 5 are formed for example with a dicing saw, for example.

Figure 1B:
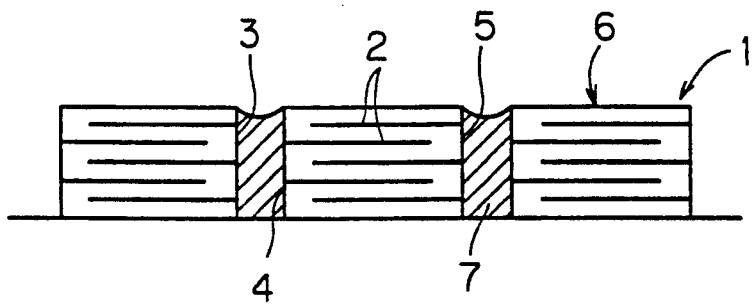

Metal paste 7 for forming external electrodes is applied into the cutting grooves 5 by casting, for example, as shown in FIG. 1(b).

Figure 1C:
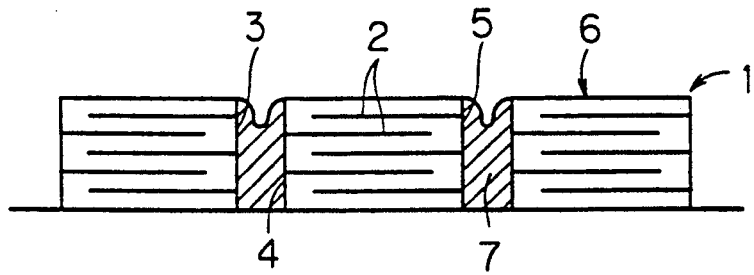

The metal paste 7 is then dried as shown in FIG. 1(c).

Figure 1D:
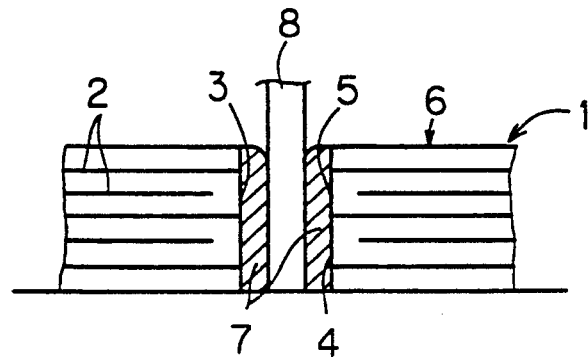

The metal paste 7 filling up each of the cutting grooves 5 is cut with, for example, a blade 8 so as, to be divided in two, as shown in FIG. 1(d). Thus, metal paste films 7 are defined on the surfaces 3 and 4 of the chips 6 in desired thicknesses.

The blade 8 is smaller in thickness than that employed for forming the cutting grooves 5 in the step shown in FIG. 1(a). It is possible to freely control the thicknesses of the metal paste films 7, which are defined on the surfaces 3 and 4 of the chips 6, by appropriately selecting the thickness of the blade for forming the cutting grooves 5 and the thickness of the blade 8 shown in FIG. 1(d) respectively.

The chips 6, thus provided with the metal paste films 7 on the surfaces 3 and 4, respectively are then fired. At this time, the green ceramic materials contained in the chips 6 are cofired with the metal paste films 7. Thus, desired multilayer ceramic capacitors are obtained.

Figure 2:
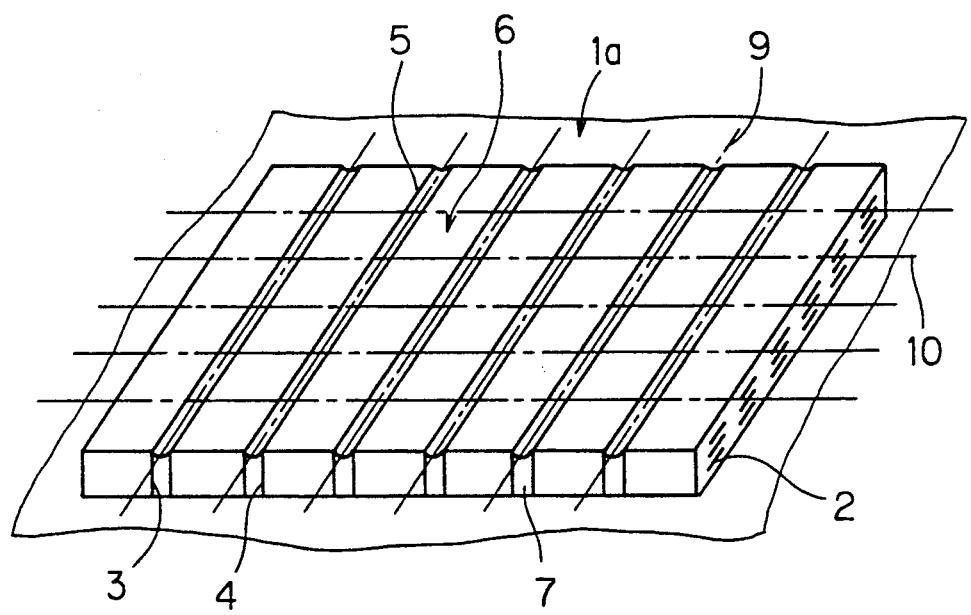
FIG. 2 is a perspective view showing a block 1a employed in another embodiment of the present invention.

FIG. 2 shows another embodiment of the present invention. Referring to FIG. 2, elements corresponding to those shown in FIGS. 1(a) to 1(d) are denoted by similar reference numerals.

In the embodiment shown in FIG. 2, a larger block 1a is prepared so that individual chips 6 are obtained when the same is cut along plural cutting lines 9 and 10 which are perpendicular to each other. Such a block 1a is first provided with cutting grooves 5, so that metal paste 7 is cast into the cutting grooves 5 and then dried. Thereafter, the block 1a is cut along the cutting lines 9 and 10 with, for example a dicing saw. The block 1a may be successively cut along the cutting lines 9 and 10 in this order, or in the reverse order.

According to the embodiment shown in FIG. 2, formation of the cutting grooves 5 and application of the metal paste 7 can be simultaneously performed in relation to a number of chips 6, whereby in particular mass production is improved.

An Experimental Example carried out according to the present invention is now described.

First, ceramic slurry was formed by a doctor blade coater, to obtain sheets of 20 μm in thickness, 150 mm in width and 10 m in length. Then, conductive films for defining internal electrodes were formed on these sheets in desired patterns, and the sheets were stacked with each other and pressed to obtain the block 1a shown in FIG. 2.

Then, a dicing saw having a blade of 100 μm in thickness was applied to the block 1a, to form the cutting grooves 5.

Then, nickel paste which was adjusted to 4 to 5 poises in viscosity was cast into the cutting grooves 5 with a spatula. Then the block 1a was dried in an oven at 70° C. for 30 minutes, and cut along the cutting lines 9 and 10, shown in FIG. 2 with a dicing saw. A blade employed in this step to cut the block 1a was smaller in thickness than the blade used for forming the cutting grooves 5.

Then, the chips 6 so obtained were debindered and fired. Thus, multilayer ceramic capacitors were obtained with nickel films provided as first layers for external electrodes. Then, silver films were formed by baking as second layers for external electrodes, and plated with Ni/Sn for improving solderability. Thus, the multilayer ceramic capacitors were completed.

In the aforementioned Experimental Example, the time required for forming the first layers for external electrodes was only 0.3 minutes as to 1000 multilayer ceramic capacitors, although the conventional method required 1 minute for such an operation. Further, it was possible to suppress deviation in thickness of the first layers, which was 120% in the conventional method, to 15% in the aforementioned Experimental Example.

While each embodiment has been described in relation to a method of manufacturing multilayer ceramic capacitors, the present invention is also applicable to chip-type ceramic electronic components other than multilayer ceramic capacitors, as well as to chip electronic components containing no ceramic material.

When the present invention is applied to chip-type ceramic electronic components, for example, the block to be provided with cutting grooves may not necessarily be unfired as hereinabove described. As an alternative a block formed from a sintered body may be provided with cutting grooves, to be subjected to the subsequent steps.

Figure 3:
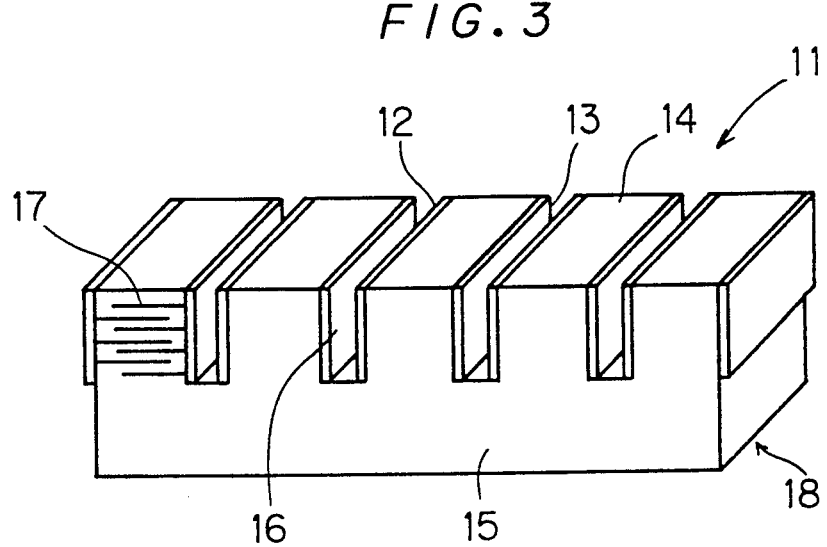
FIG. 3 is a perspective view showing a capacitor array 11 obtained by still another embodiment of the present invention.

The present invention is also applicable to the manufacture of a capacitor array 11, shown in FIG. 3. Referring to FIG. 3, a capacitor array 11 comprises a plurality of capacitor elements 14, each of which is provided with external electrodes 12 and 13 on both end surfaces thereof. These capacitor elements 14 are held by a carrier part 15, with spaces 16 defined therebetween. Each of the capacitor element 14 forms a multilayer capacitor comprising a plurality of internal electrodes 17, as shown expediently in the multilayer capacitor to the extreme left in FIG. 3. Actually, the internal electrodes 17 are not visible from the outside.

In order to obtain the aforementioned capacitor array 11, a block 18 is prepared for providing the capacitor elements 14 and the carrier part 15. In this stage, the block 18 is not yet provided with grooves corresponding to the spaces 16. This block 18 is formed by a layered product of a plurality of ceramic green sheets. The ceramic green sheets provided with the internal electrodes 17 at desired positions.

Then, grooves for defining the spaces 16 are formed in the block 18 in a manner so as not to reach the carrier part 15.

Then, metal paste for forming the external electrodes 12 and 13 is applied into the aforementioned grooves. The metal paste filling up each groove is dried and then cut so as to be divided in two.

Thereafter the block 18 is fired, whereby the capacitor array 11 is obtained.

Although the embodiments of the present invention have been described and illustrated in detail, it is clearly understood that the same is by way of illustration and example only and is not to be taken by way of limitation, the scope of the present invention being limited only by the terms of the appended claims.

What is claimed is:

1. A method of manufacturing chip electronic components comprising the steps of:
   preparing a block, said block being capable of providing a plurality of chip electronic components, each of said chip electronic components having end surfaces;
   forming cutting grooves in said block, said cutting grooves being formed along said end surfaces of said chip electronic components;
   applying metal paste for forming external electrodes, said metal paste being applied into each of said cutting grooves to fill up said cutting grooves; and
   cutting said metal paste filling up each of said cutting grooves so as to divide said metal paste in each of said cutting groove into two parts, whereby external electrodes are provided on each of said end surfaces of each of said chip electronic components.

2. A method of manufacturing chip electronic components in accordance with claim 1, wherein said chip electronic components are chip-type ceramic electronic components and said block contains a green ceramic material, said method further comprising the step of cofiring said metal paste with said green ceramic material after said step of cutting said metal paste.

3. A method of manufacturing chip electronic components in accordance with claim 1, wherein said chip electronic components are chip-type ceramic electronic components and said block contains a green ceramic material, said method further comprising the step of firing said green ceramic material before said step of forming cutting grooves.

4. A method of manufacturing chip electronic components in accordance with claim 1, wherein said step of forming cutting grooves in said block is carried out with a dicing saw.

5. A method of manufacturing chip electronic components in accordance with claim 1, further comprising the step of drying said metal paste, said step of drying said metal paste being interposed between said step of applying metal paste and said step of cutting said metal paste.

6. A method of manufacturing chip electronic components in accordance with claim 1, further comprising the step of preparing a first blade for forming said cutting grooves in said block and a second blade for cutting said metal paste, respectively; said step of preparing said first and said second blades includes the step of selecting respective thicknesses of said first and said second blades so that a difference in thickness between said first and said second blades corresponds to the thickness of said external electrodes formed on said end surfaces of said chip electronic components.

7. A method of manufacturing chip electronic components in accordance with claim 1, wherein said block is cut along first and second cutting lines, said first and second cutting lines being perpendicular to each other for providing a plurality of chip electronic components; said cutting grooves are formed along said first cutting lines; and said method further comprising the step of cutting said block along said second cutting lines.

8. A method of manufacturing an electronic component array comprising a plurality of electronic component elements, said method comprising the steps of:
   preparing a block, said block being capable of providing a plurality of electronic component elements and a carrier part disposed below said electronic component elements, said carrier part holding said electronic component elements together with spaces defined therebetween and each of said electronic component elements having end surfaces;
   forming grooves in said block, said grooves being formed along said end surfaces of said electronic component elements so as not to reach said carrier part;
   applying metal paste for forming external electrodes, said metal paste being applied into each of said grooves to fill up said grooves; and
   cutting said metal paste filling up each of said grooves so as to divide said metal paste in each of said cutting grooves into two parts, whereby external electrodes are provided on each of said end surfaces of each of said chip electronic component elements.

9. A method of manufacturing an electronic component array in accordance with claim 8, wherein each of said electronic component elements forms a capacitor.

10. A method of manufacturing an electronic component array in accordance with claim 8, wherein said block contains a green ceramic material, said method further comprising the step of cofiring said metal paste with said green ceramic material after said step of cutting said metal paste.

11. A method of manufacturing an electronic component array in accordance with claim 8, wherein said block contains a green ceramic material, said method further comprising the step of firing said green ceramic material before said step of forming grooves.

* * * * *